United States Patent
Suzuki et al.

(10) Patent No.: US 6,759,150 B2
(45) Date of Patent: Jul. 6, 2004

(54) MAGNETIC RECORDING MEDIUM COMPRISING URETHANE BINDER OF SPECIFIC TG

(75) Inventors: Masaki Suzuki, Kanagawa (JP); Hiroaki Takano, Kanagawa (JP); Masanosuke Kunikata, Kanagawa (JP)

(73) Assignee: Fuji Photo Film Co., Ltd., Kanagawa (JP)

(*) Notice: Subject to any disclaimer, the term of this patent is extended or adjusted under 35 U.S.C. 154(b) by 0 days.

(21) Appl. No.: 10/024,993

(22) Filed: Dec. 18, 2001

(65) Prior Publication Data

US 2002/0146593 A1 Oct. 10, 2002

(30) Foreign Application Priority Data

Dec. 18, 2000 (JP) .................................. P.2000-383798

(51) Int. Cl.$^7$ .................................................. G11B 5/68
(52) U.S. Cl. ........................ 428/694 BV; 428/694 BS; 428/694 BN
(58) Field of Search ...................... 428/694 B, 694 BV, 428/694 BS, 694 BN, 900

(56) References Cited

U.S. PATENT DOCUMENTS

| | | | |
|---|---|---|---|
| 6,017,605 A | * | 1/2000 | Yamazaki et al. |
| 6,074,724 A | * | 6/2000 | Inaba et al. |
| 6,203,934 B1 | * | 3/2001 | Naoe et al. |
| 6,254,964 B1 | * | 7/2001 | Saito et al. |

FOREIGN PATENT DOCUMENTS

| | | |
|---|---|---|
| JP | 3-45447 B2 | 7/1991 |
| JP | 2829972 | 12/1998 |
| JP | 11-175959 A | 7/1999 |

* cited by examiner

*Primary Examiner*—H. Thi Le
(74) *Attorney, Agent, or Firm*—Stroock & Stroock & Lavan LLP

(57) ABSTRACT

A magnetic recording medium includes: a non-magnetic support; a lower non-magnetic layer; and a magnetic layer containing a ferromagnetic powder and a binder, in this order, wherein the magnetic layer has a coercive force of 2,500 to 3,500 oersted (197.5 to 276.5 kA/m), and a squareness ratio of 0.70 to 0.85 in a length direction thereof, and the binder in the magnetic layer is a urethane resin having a glass transition temperature Tg of 70° C. or higher.

12 Claims, 1 Drawing Sheet

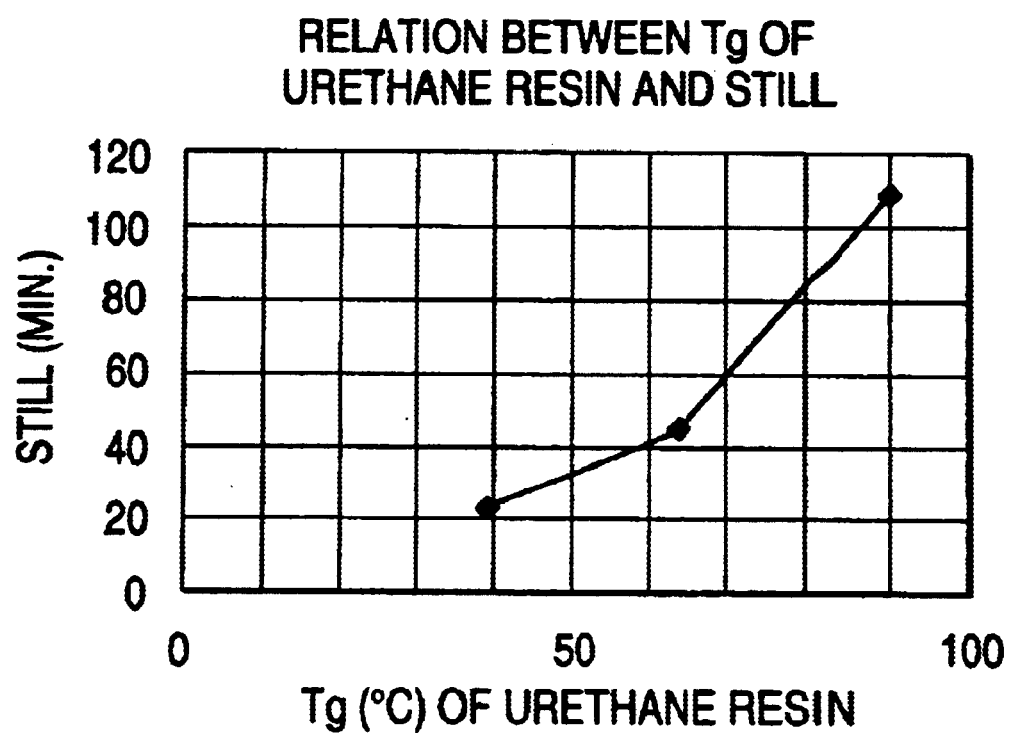

MAGNETIC RECORDING MEDIUM COMPRISING URETHANE BINDER OF SPECIFIC TG

FIELD OF THE INVENTION

The present invention relates to a magnetic recording medium comprising a non-magnetic support on which a magnetic layer containing a ferromagnetic powder dispersed in a binder is provided via a non-magnetic lower layer. More specifically, the invention is concerned with a magnetic recording medium which has excellent error-rate characteristic and high durability and is suitable for record and playback of digital signals, especially suitable as magnetic tape.

BACKGROUND OF THE INVENTION

Magnetic recording media which each have on a non-magnetic support a magnetic layer containing a ferromagnetic powder dispersed in a binder are widely used as sound recording tapes, videotapes or floppy disks. And it is required for these recording media that their characteristics, such as electromagnetic conversion characteristic, running durability and other running properties, be on high levels. For instance, higher level of ability to reproduce original sounds is required of audio tapes for reproduction of musical recordings. And excellent electromagnetic characteristics, such as excellent ability to reproduce original pictures, are required for video tapes.

In order to achieve excellent electromagnetic characteristics adaptable to the aforesaid requirements, the shift from γ-iron oxide to metallic magnetic substances as a ferromagnetic powder contained in the magnetic layer is pushed as part of improvement, and thereby enhancement of coercive force Hc and saturation magnetization $\sigma_s$ are performed. In particular, the shift to metallic magnetic substances is pushed favorably in the cases of 8-mm videotapes and videotapes for recording pictures in the broadcasting field. In addition, there has been a growing trend in recent years to record and reproduce picture and music in digital form, and degradation that original pictures or sounds experience in their reproduction and edit processes has been eliminated to enable faithful reproduction of original pictures or sounds. For evaluating tape performance in digitized settings, the error rate at the time of reproduction (rate of code error) is used. In evaluating the error rate, Japanese Patent No. 2,829,972 proposes the method of making a separation between the instrument-originated error rate and the tape-originated error rate. And in order to improve a tape-originated error rate, it has been studied to smoothen the tape surface, to make a magnetic layer be highly packed, to increase output by heightening Hc, or to elevate CNR. As the recording density is increased, however, the feasibility of improving the error rate by merely increasing output or CNR is decreased. In particular, such a tendency predominates in the cases of using digital recording wavelengths of 0.5 μm or below. As to the improvement in error rate, JP-A-11-175959 (the term "JP-A" as used herein means an "unexamined published Japanese patent application") proposes magnetic recording media for achieving a favorable error rate characteristic. However, the magnetic recording media as described in Examples of the related art are insufficient in still durability and error rate characteristic at recording frequencies of 7 MHz or above. In addition, JP-B-3-45447 (the term "JP-B" as used herein means an "examined Japanese patent publication" specifies magnetic characteristics and orientation degree of tape. However, sufficient output cannot be attained so long as the magnetic layer thickness is within the scope of Examples.

SUMMARY OF THE INVENTION

In view of the past situation as mentioned above, the invention aims to provide a magnetic recording medium having satisfactory error rate and durability when it is applied to a record reproduction apparatus operating at frequencies of 10 MHz or above.

The aforesaid objective is attained with the following magnetic recording media as embodiments of the invention.

(1) A magnetic recording medium comprising a non-magnetic support on which a magnetic layer containing a ferromagnetic powder dispersed in a binder is provided via a non-magnetic lower layer: with the magnetic layer having a coercive force of 2,500 to 3,500 oersted (197.5 to 276.5 kA/m) and a squareness ratio of 0.70 to 0.85 in the length direction, wherein the binder in the magnetic layer is a urethane resin having a glass transition temperature Tg of 70° C. or higher.

(2) A magnetic recording medium as described in Embodiment (1), wherein the ferromagnetic powder is an Fe-dominated ferromagnetic powder which further contains Co in a proportion of 30 to 40 atomic % to the Fe, either Al or Si or both of them in a proportion of 2 to 20 atomic % to the Fe, and either Y or Nd or both of them in a proportion of 7 to 15 atomic % to the Fe, and has a specific surface area of no greater than 80 m²/g as measured by BET method.

(3) A magnetic recording medium as described in Embodiment (1) or (2), wherein the magnetic layer has a thickness of 0.05 to 0.3 μm.

(4) A magnetic recording medium as described in any of Embodiments (1) to (3), wherein the lower layer has a thickness of 0.8 to 2.0 μm.

(5) A magnetic recording medium as described in any of Embodiments (1) to (4), which has a maximum magnetic flux density Bm of no greater than 3,800 Gauss and contains polyurethane having a glass transition temperature Tg of 70° C. or above in both the lower layer and the magnetic layer.

As a result of our intensive study to accomplish the aforementioned objective, the following finding has been made and the invention has been completed on the basis of this finding. Specifically, it has been found that reduction of error rate cannot be attained by a mere increase of output. More specifically, the finding is that, even if calender treatment is performed at the time of tape production with the intention of heightening an orientation force, achieving a high squareness ratio (SQ) and attaining the desired surface properties and thereby the magnetic layer is highly packed and Bm is increased to enable the magnetic recording medium to acquire high output, a deterioration in error rate is caused at recording frequencies higher than 20 MHz because of degradation in wave-form responsivity as disclosed in JP-A-5-28464. In order to avoid the deterioration in error rate, we have made various examinations and found that there is the most suitable squareness ratio for effecting both attainment of high output and reduction of error rate. Further, it has been found that adjustment of a coercive force Hc of the magnetic layer to the range of 2,500 to 3,500 oersted (197.5 to 276.5 kA/m) is essential for the objective of the invention to be attained. The term "Hc" as used herein refers to the coercive force value in the tape-running direction. When Hc is lower than 2,500 oersted (197.5 kA/m), the output at short wavelengths cannot be secured; while when Hc is higher than 4,000 oersted (316 kS/m) saturation of a head used for recording is caused to disable the attainment of high output. Therefore, the suitable Hc is from 2,500 to 3,500 oersted (197.5 to 276.5 kA/m), preferably from 2,700 to 3,000 oersted (213.3 to 237 kA/m). To sum up, the invention achieves a reduction in error rate while ensuring high output by combining the Hc setting of the magnetic layer within the specified range and the optimization of a squareness ratio of the magnetic layer. In addition, it has been found that improvement in still durability of a magnetic recording medium can be effected by combining the optimization of a squareness ratio of the magnetic layer and the optimization of the lower layer thickness. Such improvement effect is thought to be attributable to reduction in sliding resistance of a head to the magnetic layer surface brought about by the supply of a lubricant to the magnetic layer surface and the spread of an angle distribution of magnetic grains in the length direction and the spread of an angle distribution of magnetic grains in the cross-sectional direction of the magnetic layer.

Furthermore, it has been found that the adjustment of a coercive force of the magnetic layer to the range of 2,500 to 3,500 oersted can be adequately attained by using as the magnetic powder contained in the magnetic layer a Fe-dominated ferromagnetic powder which further contains Co in a proportion of 30 to 40 atomic % to the Fe, either Al or Si or both of them in a proportion of 2 to 20 atomic % to the Fe, and either Y or Nd or both of them in a proportion of 7 to 15 atomic % to the Fe. In addition, it has been also found that, when the ferromagnetic powder used in a magnetic coating composition has a specific surface area of no greater than 80 $m^2/g$ as measured by BET method, the magnetic layer surface formed by coating the magnetic coating composition, subjecting the coating layer to calendering treatment and forming tapes therefrom can be made smooth to ensure a further increase of output.

The value of a coercive force Hc as specified above is a value measured by using a vibration sample magnetometer (made by Toei Kogyo K.K.) under a condition of Hm=10 kOe (790 kA/m). Moreover, the optimal range of the squareness ratio of the present magnetic layer is from 0.7 to 0.85, especially from 0.75 to 0.80. And it is appropriate that the squareness ratios in two directions perpendicular to the tape-running direction be each not higher than 80% of the squareness ratio in the running direction.

BRIEF DESCRIPTION OF DRAWING

FIG. 1 shows a graph of relation between Tg of the urethane resins used in Example 1, Comparative Example 8 and Comparative Example 9, respectively, and still quality.

DETAILED DESCRIPTION OF THE INVENTION

Preferred embodiments of the invention are summarized as follows:

(a) The magnetic recording medium has a total thickness of 4.5 to 8.5 μm.
(b) The support used in the magnetic recording medium is a film of polyethylene terephthalate resin, polyethylene naphthalate resin, polyaramide resin or polyurethane resin.
(c) The non-magnetic powder contained in the non-magnetic layer is at least one powder selected from the group consisting of titanium dioxide, α-iron oxide, barium sulfate, zinc oxide and alumina.
(d) The ferromagnetic powder contained in the magnetic layer is an Fe-predominated ferromagnetic powder which contains Co, Al and/or Si, and Y and/or Nd in specified proportions to Fe respectively, and has a specific surface area of no greater than 80 $m^2/g$ as measured by BET method.
(e) The magnetic layer of the magnetic recording medium comprises 100 parts by weight of ferromagnetic metal powder, 8 to 24 parts by weight of binder and 3 to 15 parts by weight of non-magnetic powder.
(f) The non-magnetic lower layer and at least one magnetic layer, which is arranged in contact therewith, of the magnetic recording medium are layers formed in accordance with wet-on-wet coating method.

The invention is described below in detail, inclusive of reasons why the aforementioned embodiments are preferable.

In the first place, the non-magnetic lower layer of the present magnetic recording medium is explained. In general, it has been carried out to provide a non-magnetic lower layer in a magnetic recording medium with the intention of enhancing an adhesion force between the support and the magnetic layer and imparting favorable properties to the magnetic layer. The thickness thereof is generally not thicker than 0.5 μm. The non-magnetic powder used in the present non-magnetic lower layer can be selected from inorganic compounds, such as metal oxides, metal carbonates, metal sulfates, metal nitrides, metal carbides or metal sulfides. As these inorganic compounds, aluminum oxide having an α-alumina content of at least 90%, β-alumina, γ-alumina, θ-alumina, silicon carbide, chromium oxide, cerium oxide, α-iron oxide, goethite, corundum, silicon nitride, titanium carbide, titanium dioxide, silicon dioxide, tin oxide, magnesium oxide, tungsten oxide, zirconium oxide, boron nitride, zinc oxide, calcium carbonate, calcium sulfate, barium sulfate and molybdenum disulfide can be used alone or as mixtures of two or more thereof. Of these compounds, titanium dioxide, α-iron oxide, barium sulfate, zinc oxide and alumina are used to advantage because these compounds are easy to get at a low price in the form of a fine-grain powder having a sharp grain size distribution in the grain size range of 0.1 μm or below. In particular, it is effective to use titanium oxide and α-iron oxide. It is appropriate that those non-magnetic powders have their grain sizes in the range of 0.005 to 2 μm. However, if desired, the average grain size may fall within such a range by the combined use of non-magnetic powders differing in grain size or independent use of a non-magnetic powder having a broad grain size distribution. In particular, the suitable grain size of non-magnetic powder is within the range of 0.01 to 0.2 μm, preferably 0.02 to 0.08 μm. The suitable tap density of non-magnetic powder is from 0.05 to 2 g/ml, preferably from 0.2 to 1.5 g/ml. The suitable water content of non-magnetic powder is in the range of 0.1 to 5 weight %, preferably 0.2 to 3 weight %, particularly preferably 0.3 to 1.5 weight %. The pH of non-magnetic powder is generally in the range of 2 to 11, but the preferred pH range is from 5 to 10. The specific surface area of non-magnetic powder is generally from 1 to 100 $m^2/g$, preferably from 5 to 70 $m^2/g$, and particularly preferably from 10 to 65 $m^2/g$. The suitable crystallite size of non-magnetic powder is from 0.004 to 1 μm, preferably 0.075 to 0.2 μm. The oil absorptive capacity using dibutyl phthalate (DBP) is in the range of generally 5 to 100 ml/100 g, preferably 10 to 80 ml/100 g, particularly preferably 20 to 60 ml/100 g. The specific gravity is generally from 1 to 12, preferably from 3 to 6. The shape of non-magnetic powder maybe any of acicular, spherical, polyhedral and tabular shapes.

It is appropriate for the non-magnetic powder to have an ignition loss of no greater than 20 weight %, but it is thought to be most suitable that such a loss is essentially zero. The suitable Mohs' hardness of non-magnetic powder is from 4 to 10. The suitable roughness factor of the grain surface of non-magnetic powder is from 0.8 to 1.5, preferably from 0.9 to 1.2. The suitable amount of stearic acid adsorbed to non-magnetic powder is in the range of 1 to 20 $\mu$mol/m$^2$, preferably 2 to 15 $\mu$mol/m$^2$. It is appropriate for the non-magnetic powder to have heat of wetting with 25° C. water in the range of 200 to 600 erg/cm$^2$. Additionally, it is also possible to use solvents so far as the non-magnetic powders have heat of wetting with the solvents in the foregoing range. Further, it is appropriate that the quantity of water present on the powder surface at 100 to 400° C. be from 1 to 10 molecules per 100 Å. It is advantageous to use non-magnetic powders the pH of which is in the range of 3 to 6 at the isoelectric point in water.

It is advantageous that the non-magnetic powders as recited above undergo surface treatment with $Al_2O_3$, $SiO_2$, $TiO_2$, $ZrO_2$, $SnO_2$, $Sb_2O_3$ or ZnO. Of these oxides, $Al_2O_3$, $SiO_2$, $TiO_2$ and $ZrO_2$, especially $Al_2O_3$, $SiO_2$ and $ZrO_2$, are preferred over the others from the viewpoint of dispersibility. Those oxides may be used in combination or independently.

Such a surface treatment layer may be formed by co-precipitation of oxides, if desired, or by providing an alumina layer first and then silica layer, or vise versa. In addition, the surface treatment layer formed may be porous depending on the intended purposes, but it is generally appropriate that the layer be uniform and dense.

Examples of non-magnetic powder usable for the present lower layer include Nanotite produced by Showa Denko K.K., HIT-100 and ZA-G1 produced by Sumitomo Chemical Co., Ltd., DPN-250, DPN-250BX, DPN-245and DPN-270BX produced by Toda Kogyo K.K., titanium dioxide TTO-51B, TTO-55A, TTO-55B, TTO-55C, TTO-55S, TTO-55D and SN-100 produced by Ishihara Sangyo, $\alpha$-iron oxide E270, E271 and E300 produced by Ishihara Sangyo, STT-4D, STT-30D, STT-30 and STT-65C produced by Titan Kogyo, MT-100S, MT-100T, MT-150W, MT-500B, MT-600B, MT-100F and MT-500HD produced by Teika, FINEX-25, BF-1, BF-10, BF-20 and ST-M produced by Sakai Chemical Industry Co., Ltd., DEFIC-Y and DEFIC-R produced by Dowa Mining Co., Ltd., AS2BM and TiO2P25 produced by Nippon Aerosil Corporated, 100A and 500A produced by Ube Industries Ltd., and Y-LOP and burned substances thereof produced by Titan Kogyo.

Of these products, titanium dioxide and $\alpha$-iron oxide products, especially $\alpha$-iron oxide (hematite) products, are preferred in particular. $\alpha$-Iron oxide can be synthesized by reference to synthesis methods of $\gamma$-iron oxide, specifically under the following various conditions. For instance, $\alpha$-iron oxide ($\alpha$-$Fe_2O_3$) powder usable in the invention can be synthesized in accordance with (1) a method of producing acicular goethite grains by admitting an oxygen-containing gas into a suspension containing ferrous hydroxide colloid prepared by adding an equivalent weight or more of a water solution of alkali hydroxide to a water solution of ferrous salt to cause therein oxidation reaction, (2) a method of producing spindle-shaped goethite grains by admitting an oxygen-containing gas into a suspension containing $FeCO_3$ prepared by reacting a water solution of ferrous salt with a water solution of alkali carbonate to cause therein oxidation reaction, (3) a method comprising sequentially a step of producing acicular goethite nuclei by admitting an oxygen-containing gas into an aqueous ferrous salt solution containing ferrous hydroxide colloid prepared by adding an equivalent weight or less of a water solution of alkali hydroxide or carbonate to a water solution of ferrous salt to cause therein oxidation reaction and a step of making the acicular goethite nuclei grow by adding to the aqueous ferrous salt solution containing the acicular goethite nuclei an aqueous alkali hydroxide solution in an amount equivalent or more to the $Fe^{2+}$ in the aqueous ferrous salt solution and then admitting an oxygen-containing gas into the resulting solution, or (4) a method of synthesizing goethite grains by utilizing as precursor grains acicular goethite grains prepared by producing acicular goethite nuclei by admitting an oxygen-containing gas into an aqueous ferrous salt solution containing ferrous hydroxide colloid prepared by adding an equivalent weight or less of a water solution of alkali hydroxide or carbonate to a water solution of ferrous salt to cause therein oxidation reaction and then making the acicular goethite nuclei grow in an acidic or neutral region.

Additionally, it doesn't matter if foreign elements, such as Ni, Zn, P and Si, which are usually added for improving characteristics of powdered substances, are added as required during the goethite grains-forming reaction. The acicular $\alpha$-$Fe_2O_3$ powder can be obtained by dehydrating acicular goethite grains as precursor grains at temperatures ranging from 200 to 500° C., and, if necessary, further annealing the dehydrated grains by heating them at temperatures ranging from 350 to 800° C. Also, it doesn't matter if sintering inhibitors, such as P, Si, B, Zr and Sb, adhere to the surface of the acicular goethite grains to be dehydrated or annealed for forming acicular $\alpha$-$Fe_2O_3$ powder. A reason why annealing is carried out by heating at temperatures ranging from 350 to 800° C. is that holes made in the surface part of acicular $Fe_2O_3$ grains obtained by dehydration are blocked up through fusion of the grain surface by annealing treatment to produce a desirable effect of rendering the grain surface smooth.

The acicular $\alpha$-$Fe_2O_3$ grains obtained by dehydrating or annealing the foregoing acicular goethite grains are dispersed in an aqueous solution to be formed into a suspension. To the suspension, an aluminum compound is added, and deposited on the grain surface by pH control. Then, the resulting suspension is filtered off, washed with water, dried, pulverized and, if necessary, further degassed and subjected to consolidation treatment. It is also possible to use the thus processed grains as the non-magnetic powder to constitute the non-magnetic lower layer. Examples of an aluminum compound added in the aforementioned surface treatment include aluminum salts such as aluminum acetate, aluminum sulfate, aluminum chloride and aluminum nitride, and alkali aluminates such as sodium aluminate. The suitable proportion of the added aluminum compound to $\alpha$-$Fe_2O_3$ powder is from 0.01 to 50 weight % on an aluminum basis. When the proportion is less than 0.01 weight %, the dispersion of $\alpha$-$Fe_2O_3$ powder into a binder resin is insufficient; while, when the proportion is higher than 50 weight %, aluminum compound molecules suspended on the grain surface cause undesirable interaction between themselves. The non-magnetic powder used in the invention for the non-magnetic lower layer may be covered with not only an aluminum compound but also two or more of compounds selected from Si compounds, or other compounds including P, Ti, Mn, Ni, Zn, Zr, Sn and Sb compounds. The suitable proportions of these compounds used together with an aluminum compound to $\alpha$-$Fe_2O_3$ powder are each within the range of 0.01 to 50 weight %. When the proportion is lower than 0.01 weight %, dispersibility improving effect is hardly produced by such an addition; while, when the proportion is higher than 50 weight %, the compound molecules suspended on the grain surface interact with one another to produce undesirable effects.

By mixing carbon black in the lower layer of the present magnetic recording medium, known effects can be imparted to the lower layer. For instance, the surface electric resistance (Rs) can be lowered, the light transmittance can be reduced, and the desired micro Vickers hardness can be attained. The micro Vickers hardness of the non-magnetic lower layer is generally from 25 to 60 Kg/mm$^2$, and from the viewpoint of a head touch control it is desirable for the micro Vickers hardness to be within the range of 30 to 50 Kg/mm$^2$. This micro Vickers hardness is measured with a thin-film hardness meter (HMA-400, made by Nippon Electric Co.), wherein a triangular pyramid-shaped diamond stylus having an arris angle of 80 degrees and a tip radii of 0.1 $\mu$m is used as the tip of a pressure element. The light transmission of the non-magnetic lower layer is generally adjusted so that the infrared ray absorption by the lower layer at a wavelength of about 900 nm becomes 3% or below. In the case of a VHS-format magnetic tape, for instance, the light transmission is standardized at 0.8% or below.

As carbon black mixed in the non-magnetic lower layer, furnace black for rubber use, thermal black for rubber use, carbon black for color and acetylene black can be utilized. The carbon black used in the present lower layer generally has its specific surface area in the range of 100 to 500 m$^2$/g, preferably 150 to 400 m$^2$/g, and its DBP absorptive capacity in the range of 20 to 400 ml/100 g, preferably 30 to 200 ml/100 g. The particle size of carbon black used is generally from 5 to 80 nm, preferably from 10 to 50 nm, particularly preferably from 10 to 40 nm. Further, it is appropriate that the pH, water content and tap density of the carbon black used be from 2 to 10, from 0.1 to 10% and from 0.1 to 1 g/ml, respectively. Examples of carbon black usable in the lower layer include BLACKPEARLS 2000, 1300, 1000, 900, 800, 880 and 700, and VULCAN XC-72 produced by Cabot Co., #3050B, #3150B, #3250B, #3750B, #3950B, #950, #650B, #970B, #850B, MA-600 produced by Mitsubishi Chemical Industries Ltd., CONDUCTEX SC, RAVEN 8800, 8000, 7000, 5750, 5250, 3500, 2100, 2000, 1800, 1500, 1255 and 1250 produced by Colombia Carbon Co., and Ketjen Black EC produced by Akzo Co. In advance of its use, carbon black maybe surface-treated with a dispersing agent, a resin may be grafted onto carbon black, or carbon black surface may be partly converted into graphite. On the other hand, carbon black may be dispersed into a binder before it is added to a coating composition. The thus pre-treated carbon black can be used in a proportion lower than 50 weight % to the inorganic compound powder as recited above, and that lower than 40 weight % to the total weight of non-magnetic layer. The carbon black of various kinds as recited above may be used alone or as combinations. Details of various kinds of carbon black usable in the present invention can refer to, e.g., *Carbon Black Binran* (which maybe translated by the English title "*Handbook of Carbon Black*"), compiled by Carbon Black Association.

To the non-magnetic lower layer, organic powders can also be added depending on the intended purposes. Examples of an organic powder which can be added include acrylic-styrene resin powder, benzoguanamine resin powder, melamine resin powder and phthalocyanine pigments. Further, polyolefin resin powder, polyester resin powder, polyamide resin powder, polyimide resin powder and polyfluoroethylene resin powder may be used.

Examples of a binder, a lubricant, a dispersing agent, additives, a solvents and a dispersing method which can be used for the non-magnetic lower layer include those respectively described below for the present magnetic layer. With respect to the amount and the kind of binder, additives, and the amount and the kind of dispersing agent in particular, known techniques for a magnetic layer are applicable in forming the lower layer.

In the next place, the magnetic layer of the present magnetic recording medium is described.

Examples of a ferromagnetic powder used in the magnetic layer include ferromagnetic metal powders containing $\alpha$-Fe, Ni or Co as a main component (in a proportion of at least 50%). Of these powders, ferromagnetic alloy powders containing $\alpha$-Fe as the main component are preferred over the others. In particular, it is advantageous to use Fe-dominated ferromagnetic alloy powders which each further contain Co in a proportion of 30 to 40 atomic % to the Fe, either Al or Si or both of them in a proportion of 2 to 20 atomic % to the Fe, and either Y or Nd or both of them in a proportion of 7 to 15 atomic % to the Fe, and have a specific surface area of no greater than 80 m$^2$/g as measured by BET method. Besides containing the metal atoms specified above as essential components, these ferromagnetic alloy powders may contain other atoms such as S, Sc, Ca, Ti, V, Cr, Cu, Mo, Rh, Pd, Ag, Sn, Sb, Te, Ba, Ta, W, Re, Au, Hg, Pb, Bi, La, Ce, Pr, P, Mn, Zn, Ni, Sr and B. To the $\alpha$-Fe-predominated ferromagnetic alloy powders in particular, it is of importance to contain Al, Si, Ca, Y, Ba, La, Nd, Co, Ni and B as elements other than $\alpha$-Fe. Prior to dispersion, these ferromagnetic metal powders may be treated with a dispersing agent, a lubricant, a surfactant or/and an anti-static agent. Details of these treatments are described in, e.g., JP-A-44-14090, JP-A-45-18372, JP-B-47-22062, JP-B-47-22513, JP-B-46-28466, JP-B-46-38755, JP-B-47-4286, JP-B-47-12422, JP-B-47-17284, JP-B-47-18509, JP-B-18573, JP-A-39-10307, JP-B-48-39639, and U.S. Pat. Nos. 3,026,215, 3,031,341, 3,100,194, 3,242,005 and 3,389,014. In addition, these ferromagnetic metal powders may contain a small amount of hydroxides or oxides.

The ferromagnetic metal powders usable for the magnetic layer are those obtained by known production methods. Examples of a production method applicable in the invention include (1) a method of reducing a compound organic acid salt (mainly an oxalate) with a reducing gas, such as hydrogen, (2) a method of producing particulate Fe or Fe—Co via reduction of iron oxide with a reducing gas, such as hydrogen, (3) a method of thermally decomposing a metal carbonyl compound, (4) a method of adding a reducing agent, such as sodium borohydride, a hydrophosphite or hydrazine, to a water solution of ferromagnetic metal ions, and (5) a method of evaporating a metal in an inert gas atmosphere of low pressure, thereby pulverizing the metal. Before using in the magnetic layer, the ferromagnetic metal powders produced by the methods as described above may be subjected to any of slow oxidation treatments, including a method of drying the powders after immersion in an organic solvent, a method of immersing the powders in an organic solvent and there into blowing an oxygen-containing gas to form an oxide layer on the particle surface and further drying the particles, and a method of forming an oxide layer on the particle surface by controlling pressure shares of oxygen gas and inert gas without using any organic solvent.

The Hc of a ferromagnetic metal powder used in the magnetic layer is generally from 1,500 to 4,000 oersted (118.5 to 316 kA/m), preferably from 1,800 to 3,500 oersted (142.2 to 276.5 kA/m), particularly preferably from 2,000 to 3,000 oersted (158 to 237 kA/m). The saturation magnetization ($\sigma$s) of the ferromagnetic metal powder is generally from 110 to 200 emu/g (A·m$^2$/kg), preferably from 125 to 180 emu/g (A·m$^2$/kg), particularly preferably from 135 to 160 emu/g (A·m$^2$/kg). The particle length of the ferromagnetic metal powder is generally from 0.03 to 0.20 μm, preferably from 0.04 to 0.15 μm, particularly preferably from 0.06 to 0.11 μm. The crystallite size of the ferromagnetic metal powder is generally from 80 to 300 Å, preferably from 100 to 200 Å, particularly preferably from 120 to 190 Å. The suitable aspect ratio of the ferromagnetic metal powder is from 4 to 18, preferably from 5 to 12. The water content in the ferromagnetic powder is preferably controlled to the range of 0.01 to 2 weight %. And it is appropriate that the water content in the ferromagnetic metal powder be optimized depending on the kind of the binder used together.

As to the specific surface area measured by BET method, the ferromagnetic powder used in the magnetic layer generally has its value in the range of 80 $m^2/g$ or less, preferably 25 to 80 $m^2/g$, more preferably 45 to 80 $m^2/g$, furthermore preferably in the range of 50 to 70 $m^2/g$. It may be undesirable for the ferromagnetic powder to have its specific surface area outside the foregoing range, because the specific surface area smaller than 25 $m^2/g$ may cause a noise increase and that greater than 80 $m^2/g$ makes it difficult to attain satisfactory surface properties.

Further, it is advantageous that the pH of the ferromagnetic powder be optimized depending on the combination with the binder used. The optimal pH range is generally from 4 to 12, preferably from 6 to 10. The ferromagnetic metal powder may receive surface treatment with Al, Si, P or an oxide of such an element, if desired. The proportion of such an element or its oxide to the ferromagnetic metal powder is generally from 0.1 to 10 weight %. This surface treatment can produce a desirable effect that the adsorption of a lubricant, such as fatty acids, can be controlled to 100 mg/$m^2$ or below.

Cases are met with that the ferromagnetic metal powder used contains inorganic soluble ions, such as Na, Ca, Fe, Ni and Sr ions. These ions have little effect on characteristics of the magnetic layer so far as their content is 200 ppm or below.

Further, it is more advantageous to use a ferromagnetic metal powder having fewer pores in the magnetic layer. The suitable proportion of pores is 20 volume % or below, preferably 5 volume % or below. In addition, the ferromagnetic metal powder used in the invention may have any of acicular, rice-grain and spindle shapes as far as it meets the foregoing particle size requirements. In order to control SFD (switching field distribution) of the ferromagnetic metal powder to 0.6 or below, the ferromagnetic metal power is required to have a narrow Hc distribution. The narrow distribution of Hc can be attained by making a size distribution of geothite narrow or preventing γ-hematite from being sintered.

The binders used in the magnetic layer may be any of resins hitherto used as binders, including known thermoplastic resins, thermosetting resins, reactive resins and mixtures thereof. As described hereinbefore, these binders can also be applied to the non-magnetic lower layer.

As to the thermoplastic resins usable as binders, their glass transition temperatures are generally within the range of –100 to 150° C., their number average molecular weights are generally within the range of 1,000 to 200,000, preferably 10,000 to 100,000, and their polymerization degrees are generally of the order of 50 to 1,000. Examples of such thermoplastic resins include homopolymers and copolymers containing constituent units derived from monomers such as vinyl chloride, vinyl acetate, vinyl alcohol, maleic acid, acrylic acid, acrylic acid ester, vinylidene chloride, acrylonitrile, methacrylic acid, methacrylic acid ester, styrene, butadiene, ethylene, vinyl butyral, vinyl acetal and vinyl ether, polyurethane resin and various resins of rubber type.

And examples of thermosetting resins or reactive resins include phenol resin, epoxy resin, polyurethane resin of cure type, urea resin, melamine resin, alkyd resin, acrylic reactive resin, formaldehyde resin, silicone resin, epoxy-polyamide resin, a mixture of polyester resin and isocyanate prepolymer, a mixture of polyesterpolyol and polyisocyanate, and a mixture of polyurethane and polyisocyanate. Details of these resins are described, e.g., in *Plastics Handbook*, published by Asakura Shoten. In addition, it is possible to use known electron beam-curable resins in the magnetic layer or the non-magnetic lower layer. Detailed explanation of such resins and manufacturing methods thereof can be found in JP-A-62-256219.

The resins as recited above can be used alone or as a combination of two or more thereof, if desired. As suitable examples of a resin combination, mention may be made of a combination of polyurethane resin and at least one resin selected from the groups consisting of vinyl chloride resin, vinyl chloride-vinyl acetate copolymer, vinyl chloride-vinyl acetate-vinyl alcohol copolymer and vinyl chloride-vinyl acetate-maleic anhydride copolymer, and a combination of any of the foregoing combinations and polyisocyanate. As the makeup of the polyurethane resin used as binder, known ones including polyesterpolyurethane, polyetherpolyurethane, polyetherpolyesterpolyurethane, polycarbonatepolyurethane, polyesterpolycarbonatepolyurethane, polycaprolactonepolyurethane and polyolefinpolyurethane can be adopted.

When it is required to impart higher dispersibility and durability to the above resins used as binders, at least one polar group selected from —COOM, —$SO_3$M, —$OSO_3$M, —P=O(OM)$_2$, —O—P=O(OM)$_2$ (wherein M is a hydrogen atom or an alkali metal), —OH, —$NR_2$, —$N^+R_3$ (wherein R is a hydrocarbon group), epoxy group, —SH, —CN, sulfo betaine, phospho betaine, or carboxy betaine is preferably introduced into each binder on an as needed basis. The suitable amount of such polar groups introduced is generally from $10^{-1}$ to $10^{-8}$ eq/g, preferably from $10^{-2}$ to $10^{-6}$ eq/g.

Examples of such resins usable as the binder include MR-104, MR-105, MR110, MR100, MR555 and 400X-110A produced by ZEON CORP., Vylon UR8200, UR8300, UR-8600, UR-5500, UR-4300, RV530, RV280, FB-84 and FB-79 produced by Toyobo Co., Daiferamine 4020, 5020, 5100, 5300, 9020, 9022 and 7020 produced by Dainichiseika C. & C. Mfg., MX5004 produced by Mitsubishi Chemical Industries Ltd., Sanprene SP-150, TIM-3003 and TIM-3005 produced by Sanyo Chemical Industries Co., Ltd., and Saran F310 and F210 produced by Asahi Chemical Industry Co., Ltd. Of these resins, MR-104, MR110, UR-8200, UR8300, UR-8600, UR-5500, UR-4300 and TIM-3005 are preferred over the others.

It is appropriate that the polyurethane resin suitable for the foregoing binders have a glass transition temperature Tg of 70° C. or higher, preferably 80 to 120° C., more preferably 90 to 100° C., endure an elongation of 100 to 2,000% and a stress of 0.05 to 10 kg/$cm^2$ before it breaks, and have a yield point of 0.05 to 10 Kg/$cm^2$. From the viewpoint of ensuring good dispersibility and high durability, the polyurethane resins preferred over the others are (1) a polyurethane resin including polyurethane produced by principally reacting polyesterpolyol, a chain extension agent and an organic diisocyanate, wherein the polyesterpolyol contains an aliphatic dibasic acid in its basic acids and at least 70 mole % of the diol component thereof is constituted of aliphatic diols having branched-alkyl side chains but having no cyclic structures, and wherein the chain extension agent is an aliphatic diol having branched-alkyl side chains which contain at least 3 carbon atoms in total; and (2) a polyurethane resin produced by reacting 10 to 50 weight % of polyol having 1 to 6 mmol/g of ether groups, 15 to 50 weight % of a chain extension agent constituted of diols having cyclic structure and remainder weight % of organic diisocyanates.

Examples of a branched aliphatic diol which can suitably applied to the polyesterpolyol of the polyurethane resin (1) include 2,2-dimethyl-1,3-propanediol, 2-ethyl-2-butyl-1,3-propanediol and 2,2-diethyl-1,3-propanediol. The suitable proportion of diols having branched side chains in the total diols is from 80 to 100 mole %, preferably from 90 to 100 mole %. As to the aliphatic dibasic acids, succinic acid, adipic acid and sebacic acid are preferred. The suitable proportion of aliphatic dibasic acids in the total dibasic acid component of the polyesterpolyol is at least 70 mole %. When the proportion is lower than 70 mole %, the cyclic structure-containing dibasic acid component, such as aromatic dibasic acids, is increased substantially to result in a decrease of solubility in solvent and deterioration of dispersibility.

As to the short-chain diols having cyclic structures usable for the polyurethane resin (2), hydrogenated bisphenol A and propylene oxide adduct of hydrogenated bisphenol A are preferred. The suitable proportion of short-chain diols having cyclic structures is from 20 to 40 weight %. When the proportion is lower than 20 weight %, the mechanical strength is lowered and the durability is reduced. When the proportion is higher than 40 weight %, on the other hand, the solubility in solvent and the dispersibility are lowered. As to the ether group-containing polyol, hydrogenated bisphenol A and polypropylene oxide adduct of hydrogenated bisphenol A are preferred. The suitable proportion of the ether group-containing polyols is from 20 to 45 weight %. When the proportion is lower than 20 weight %, adsorption to powder becomes difficult and the dispersibility is lowered. When the proportion is higher than 45 weight %, on the other hand, the coating layer strength is lowered and the durability is reduced.

The appropriate urethane group concentration in the polyurethane resin (1) is from 2.5 to 4.5 mmol/g, preferably from 3.0 to 4.0 mmol/g. When the concentration is lower than 2.5 mmol/g, the Tg of coating layer is lowered and the durability is reduced. When the concentration is higher than 4.5 mmol, on the other hand, the solubility in solvent is lowered, the dispersibility is degraded, and further the difficulties in producing the polyurethane, such as difficulty in controlling the molecular weight, tend to be caused due to substantial reduction in polyol content.

The suitable weight average molecular weight Mw of polyurethane resins (1) and (2) each is from $3 \times 10^4$ to $7 \times 10^4$, preferably from $4 \times 10^4$ to $6 \times 10^4$. When the resin has Mw less than $3 \times 10^4$, the coating layer has low strength and the durability thereof is reduced; while the resin has Mw more than $7 \times 10^4$, it has low solubility in a solvent and the dispersibility thereof is reduced. The appropriate Tg of the polyurethane resins (1) and (2) each is from 80 to 120° C. When the Tg is lower than 80° C., the coating layer strength at high temperatures is low, and the durability and the keeping quality are degraded. When the Tg is higher than 120° C., on the other hand, the formability by calender is lowered and the electromagnetic conversion characteristics are degraded.

The suitable examples of polar groups contained in the polyurethane resins (1) and (2) each include —$SO_3M$, —$OSO_3M$, —$PO_3M_2$ and —COOM (wherein M represents a hydrogen atom or an alkali metal atom), preferably —$SO_3M$ and —$OSO_3M$. The appropriate content of polar groups is from $1 \times 10^{-5}$ to $2 \times 10^{-4}$ eq/g. When the content is less than $1 \times 10^{-5}$ eq/g, the adsorption to magnetic powder becomes insufficient, and the dispersibility is lowered; while, when the content is more than $2 \times 10^{-4}$ eq/g, the resin has low solubility in a solvent and the dispersibility thereof is reduced.

The number of OH groups contained in the polyurethane resins (1) and (2) each is from 2 to 20 per molecule, preferably from 3 to 15 per molecule. When the number of OH groups is less than 3 per molecule, the resin is low in reactivity with an isocyanate as curing agent. So the coating layer strength is lowered and the durability is degraded. When the number of OH groups is more than 15 per molecule, on the other hand, the resin has low solubility in a solvent and the dispersibility thereof is reduced.

Examples of polyisocyanate usable for the foregoing binders include isocyanates, such as tolylene diisocyanate, 4,4'-diphenylmethane diisocyanate, hexamethylene diisocyanate, xylylene diisocyanate, naphthylene-1,5-diisocyanate, o-toluidine diisocyanate, isophorone diisocyanate and triphenylmethane triisocyanate, reaction products of these isocyanates and polyalcohols, and polyisocyanates as condensation products of isocyanates.

Commercially available products of the isocyanates as recited above are, e.g., Colonate L, Colonate HL, Colonate 2030, Colonate 2031, Millionate MR and Millionate MTL (trade names, produced by Nippon Polyurethane Industry Co., Ltd.), Takenate D-102, Takenate D-110N, Takenate D-200and Takenate D-202 (trade names, produced by Takeda Chemical Industries, Ltd.), and Desmodur L, Desmodur IL, Desmodur N and Desmodur HL (trade names, produced by Sumitomo Bayer Co., Ltd.) . These products may be used alone or as a combination made of at least two products utilizing a difference in curing reactivity.

In the magnetic layer, the binder constituted of resins as recited above are used in a proportion of generally 8 to 24 weight %, preferably 12 to 24 weight %, to ferromagnetic metal powder. As a suitable example of combined use of resins, mention may be made of a combination of 5 to 30 weight % of vinyl chloride resin, 2 to 20 weight % of polyurethane resin and 2 to 20 weight % of polyisocyanate. In particular, it is advantageous to compose the magnetic layer so as to be free of polyisocyanate and the non-magnetic lower layer so as to contain polyisocyanate. This is because this composition is effective in preventing polyisocyanate from causing curing reaction in a coating solution for the magnetic layer to flocculate ferromagnetic metal particles.

The present magnetic recording medium is comprised of at least two layer, a non-magnetic lower layer and a magnetic layer. The non-magnetic lower layer and the magnetic layer each may have a single or multiple layer structure. Of course, these constituent layers may vary in binder content, proportions of vinyl chloride resin, polyurethane resin, polyisocyanate and other resins in the binder used, molecular weights of constituent resins, contents of polar groups in constituent resins, or physical characteristics of constituent resins, if desired. And thereto are applicable known techniques on multilayer magnetic media. In the cases of making changes to binder contents in the constituent layers, e.g., a combination of upper (magnetic) and lower (non-magnetic) layers, a combination of upper (magnetic), intermediate (non-magnetic) and lower (magnetic) layers or a combination of upper (magnetic), intermediate (magnetic) and lower (non-magnetic) layers, an increase of a binder content in the magnetic layer is effective in reducing scratches on the magnetic layer surface, and an improvement in head touch on a magnetic head can be achieved by increasing a binder content in the non-magnetic intermediate layer to impart flexibility.

The carbon black usable in the magnetic layer includes furnace black for rubber use, thermal black for rubber use, carbon black for color, and acetylene black. It is appropriate that the carbon black used in the magnetic layer have its specific surface area in the range of 5 to 500 m$^2$/g, its DBP absorptive capacity in the range of 10 to 400 ml/100 g, its average particle size in the range of 5 to 300 nm, its pH in the range of 2 to 10, its water content in the range of 0.1 to 10 weight % and its tap density in the range of 0.1 to 1 g/cc. Examples of commercially available carbon black include BLACKPEARLS 2000, 1300, 1000, 900, 800 and 700, and VULCAN XC-72 produced by Cabot Co., #80, #60, #55, #50 and #35 produced by Asahi Carbon Co., Ltd., #2400B, #2300, #900, #1000, #30, #40 and #10B produced by Mitsubishi Chemical Industries Ltd., and CONDUCTEX SC, RAVEN 150, 50, 400, and 15produced by Colombia Carbon Co. In advance of its use, carbon black may be surface-treated with a dispersing agent, a resin may be grafted onto carbon black, or carbon black surface may be partly converted into graphite. Also, carbon black may be dispersed into a binder before it is added to a magnetic coating composition. The carbon black powders as recited above can be used alone or as combinations. The suitable proportion of carbon black to a ferromagnetic powder is from 0.1 to 30 weight %. The carbon black mixed in the magnetic layer has functions of preventing electrification, reducing a friction coefficient, screening out light and increasing the layer strength. Which function the carbon black performs depends on the nature of the carbon black used. Therefore, the types, amounts and combinations of carbon black products may be different between the magnetic layer and the non-magnetic lower layer. Of course, it is possible to choose different carbon black products for the magnetic layer and the lower layer on the basis of the foregoing properties, such as the particle size, oil absorption, electric conductivity and pH, so as to suite respective purposes of those layers. Details of various types of carbon black usable in the present magnetic layer can refer to, e.g., *Carbon Black Binran* (which may be translated by the English title "*Handbook of Carbon Black*"), compiled by Carbon Black Association.

As to abrasives for the magnetic layer, known materials having Mohs' hardness of at least 6, such as aluminum oxide having an α-alumina content of at least 90%, β-alumina, silicon carbide, chromium oxide, cerium oxide, α-iron oxide, corundum, synthetic diamond, silicon nitride, titanium carbide, titanium dioxide, silicon dioxide and boron nitride can be mainly used alone or as combinations. Further, these abrasives maybe used in the form of complex (obtained by treating the surface of one abrasive with another abrasive). Although those abrasives sometimes contain compounds or elements other than their main components, they can function as abrasives as far as the proportion of their respective main components is greater than 90 weight %. The appropriate particle sizes of those abrasives are from 0.01 to 1 μm. Abrasives having different particle sizes may be combined if desired, or abrasives may be used individually as far as their particle size distributions are broad. It is favorable that the abrasives used in the magnetic layer have their tap densities in the range of 0.3 to 1.5 g/cc, their water contents in the range of 0.1 to 5 weight %, their pH values in the range of 2 to 11 and their specific surface areas in the range of 1 to 30 m$^2$/g. The abrasives used may have any of acicular, spherical and cubic shapes. However, shapes having edges in places are advantageous from the viewpoint of abrasive capability. Examples of commercially available abrasives include AKP-20, AKP-30, AKP-50, HIT-50, HIT-60, HIT-60A, HIT-70A, HIT-80, HIT-8G and HIT-100, which are products of Sumitomo Chemical Co., Ltd.; G5, G7and S-1, which are products of Nippon Chemical Industrial Co., Ltd.; and TF100 and TF140, which are products of Toda Kogyo K.K. These abrasives can be added to the lower layer, too. And it is needless to say that the abrasives used in the magnetic layer can be changed in size, amount and combination from those used in the lower layer with reference to intended purposes. The abrasives as recited above may be in advance dispersed into a binder, and then added to a magnetic coating composition. The appropriate number of abrasive grains present on the top and end faces of the present magnetic layer is from 5 to 30 per 100 μm$^2$.

Additives having a lubricating effect, an anti-static effect, a dispersing effect or a plasticizing effect can be used in the present magnetic layer. As examples of compounds usable as such additives, mention may be made of molybdenum disulfide, tungsten disulfide, graphite, boron nitride, fluorinated graphite, silicone oil, polar group-containing silicone, fatty acid-modified silicone, fluorine-containing silicone, fluorine-containing alcohol, fluorine-containing ester, polyolefin, polyglycol, alkyl phosphoric acid ester and alkali metal salts thereof, alkylsulfuric acid ester and alkali metal salts thereof, polyphenyl ether, fluorine-containing alkylsulfuric acid ester and alkali metal salts thereof, monohydric to hexahydric alcohol containing 12 to 22 carbon atoms (which may have unsaturated bonds or branched chains), alkoxyalcohol containing 12 to 22 carbon atoms (which may have unsaturated bonds or branched chains), mono-, di- or trifatty acid ester produced by reaction of 10–24C monobasic fatty acid (which may have unsaturated bonds or branched chains) with one kind of alcohol chosen from 2–12C monohydric to hexahydric alcohols (which may have unsaturated bonds or branched chains), fatty acid ester of polyalkylene oxide monoalkyl ether, fatty acid amide containing 8 to 22 carbon atoms, and aliphatic amine containing 8 to 22 carbon atoms. These additives can also be applied to the non-magnetic lower layer.

More specifically, the foregoing additives include lauric acid, myristic acid, palmitic acid, stearic acid, behenic acid, butyl stearate, oleic acid, linolic acid, linolenic acid, elaidic acid, octyl stearate, amyl stearate, isooctyl stearate, octyl myristate, butoxyethyl stearate, anhydrosorbitan monostearate, anhydrosorbitan distearate, anhydrosorbitan tristearate, oleyl alcohol and lauryl alcohol. Further, non-ionic surfactants of alkylene oxide type, glycerin type, glycidol type and alkylphenol-ethylene oxide adduct type, cationic surfactants, such as cyclic amines, ester amides, quaternary ammonium salts, hydantoin derivatives, heterocyclic compounds, phosphoniums and sulfoniums, anionic surfactants containing acid groups such as carboxyl, sulfo, phospho, sulfate and phosphate groups, and amphoteric surfactants, such as amino acids, aminosulfonic acids, sulfuric or phosphoric acid esters of aminoalcohols, and alkyl betaine-type surfactants, can be used. Details of these surfactants are described in *Kaimen Kasseizai Binran* (which may be translated by the English title "*Handbook of Surfactants*"), published by Sangyo Tosho K.K. The lubricants and anti-static agents as recited above are not always required to be 100% pure, but may contain impurities, such as isomers, unreacted materials, by-products, decomposed matter and oxides. The allowable level of contamination with such impurities is below 30 weight %, preferably below 10 weight %.

Those lubricants and surfactants, as described above, can also be used in the non-magnetic lower layer in addition to the magnetic layer, and the types and addition amounts thereof can vary as required between the non-magnetic lower layer and the magnetic layer. For instance, cases are conceivable where the ooze from the layer surface is controlled by using fatty acids differing in melting point or esters differing in boiling point and polarity in the lower layer and the magnetic layer respectively, the coating stability is enhanced by controlling the amount of surfactants added to each layer, and the lubricating effect is improved by adding a greater amount of lubricant to the lower layer. Needless to say, the cases mentioned above should not be construed as limiting the scope of the invention. All or part of additives used for the present magnetic layer may be added in any of processes for preparing a magnetic coating composition. For instance, there may be cases where the additives are mixed with a ferromagnetic powder prior to the kneading process, they are added during the process of kneading a ferromagnetic powder, a binder and a solvent, they are added in the process of dispersion, they are added after the dispersion process, and they are added just before coating. In other cases, the intended purposes can be achieved by simultaneous or successive coating of all or part of the additives on a magnetic layer already formed as desired. In still other cases, the magnetic layer surface may be coated with a lubricant after calendering (heating and pressing treatment with a calender roll) or slitting operation.

Examples of such lubricants include NAA-102, NAA-415, NAA-312, NAA-160, NAA-180, NAA-174, NAA-175, NAA-222, NAA-34, NAA-35, NAA-171, NAA-122, NAA-142, NAA-173K, caster oil-hydrogenated fatty acid, NAA-42, NAA-44, Cation SA, Cation MA, Cation AB, Cation BB, Nimean L-201, Nimean L-202, Nimean S-202, Nonion E-208, Nonion P-208, Nonion S-207, Nonion K-204, Nonion NS-202, Nonion NS-210, Nonion HS-206, Nonion L-2, Nonion S-2, Nonion S-4, Nonion O-2, Nonion LP-20R, Nonion PP-40R, Nonion SP-60R, Nonion OP-80R, Nonion OP-85R, Nonion LT-221, Nonion ST-221, Nonion OT-221, Monogly MR, Nonion DS-60, Anon BF, Anon LG, butyl stearate, butyl laurate and erucic acid produced by NOF Corporation., oleic acid produced by Kanto Kagaku K.K., FAL-205 and FAL-123 produced by Takemoto Oil & Fat Co., Ltd.., ENUJELB LO, ENUJELB IPM and SANSOCIZER E4030 produced by New Japan Chemical, TA-3, KF-96, KF96L, KF96H, KF410, KF420, KF965, KF54, KF50, KF56, KF907, KF851, X-22-819, X-22-822, KF905, KF700, KF393, KF-857, KF-860, KF-865, X-22-980, KF-101, KF-102, KF-103, X-22-3710, X-22-3715, KF-910 and KF-3935 produced by Shin-Etsu Chemical Industry Co., Ltd., Armide P, Armide C and Armoslip CP produced by Lion Armargh Co., Duomine TDO produced by Lion Corp., BA-41G produced by Nisshin Oil Mills, and Prophan 2012E, Newpole PE61, Ionet MS-400, Ionet MO-200, Ionet DL-200, Ionet DS-300, Ionet DS-1000 and Ionet DO-200 produced by Sanyo Kasei.

Examples of an organic solvent usable in the invention include ketones, such as acetone, methyl ethyl ketone, methyl isobutyl ketone, diisobutyl ketone, cyclohexanone, isophorone and tetrahydrofuran; alcohol substances, such as methanol, ethanol, propanol, butanol, isobutyl alcohol, isopropyl alcohol and methylcyclohexanol; esters, such as methyl acetate, butyl acetate, isobutyl acetate, isopropyl acetate, ethyl lactate and glycol acetate; glycol ethers, such as glycol dimethyl ether, glycol monoethyl ether and dioxane; aromatic hydrocarbons, such as benzene, toluene, xylene, cresol and chlorobenzene; chlorinated hydrocarbons, such as methylene chloride, ethylene chloride, carbon tetrachloride, chloroform, ethylene chlorohydrin and dichlorobenzene; N,N-dimethylformamide; and hexane. These solvents can be used in arbitrary proportions. And they are not always required to be 100% pure, but may contain impurities, such as isomers, unreacted materials, by-products, decomposed matter, oxides and moisture. The allowable level of contamination with such impurities is below 30 weight %, preferably below 10 weight %. It is appropriate that the solvents used in the present magnetic layer and intermediate layer be similar in kind. However, they may be different in amount added. But the bottom line is that the coating stability be enhanced by using a solvent having high surface tension (e.g., cyclohexanone, dioxane) in the intermediate layer, more specifically the arithmetic mean of surface tension values of solvents used for the magnetic layer be not below the arithmetic mean of surface tension values of solvents used for the non-magnetic lower layer. For promoting the dispersibility, it is appropriate that the polarity of solvents used be high to a certain extent. Therefore, the suitable proportion of solvents having their permittivity in the range of 15 to 20 in the solvent composition is at least 50 weight %. Further, it is advantageous that the dissolution parameter is from 8 to 11.

The appropriate thicknesses of the main constituents of the present magnetic recording medium are described below.

The thickness of a non-magnetic support is generally from 2.0 to 3.0 $\mu$m, preferably from 3.0 to 7.5 $\mu$m, particularly preferably from 4.0 to 7.0 $\mu$m. The thickness of the non-magnetic lower layer is generally from 0.2 to 4.0 $\mu$m, preferably 0.3 to 2.0 $\mu$m, particularly preferably from 0.5 to 1.5 $\mu$m. In order to improve adhesion between the non-magnetic support and the non-magnetic lower layer, an adhesive layer can be provided. The thickness of the adhesive layer is generally from 0.01 to 2 $\mu$m, preferably from 0.02 to 0.5 $\mu$m. Further, the non-magnetic support may be provided with a backing coat layer on the side opposite to the magnetic layer side. The thickness of this backing coat layer is generally from 0.1 to 2 $\mu$m, preferably from 0.3 to 1.0 $\mu$m. To these adhesive and backing coat layers, known ones are applicable respectively.

And the total thickness of the present magnetic recording medium is generally from 4.5 to 8.5 $\mu$m, preferably from 5.0 to 7.3 $\mu$m, particularly preferably from 6.3 to 7.3 $\mu$m. The total thickness smaller than 4.5 $\mu$m is undesirable because the tape having such a total thickness is reduced in stiffness to fail to have sufficient running durability, and tends to become unstable at the head-tape interface. On the other hand, the tape having a total thickness greater than 8.5 $\mu$m is undesirable because the stiffness thereof becomes too high to ensure a smooth head-tape interface.

The non-magnetic support used in the invention is a known film having a micro Vickers hardness of generally 75 to 150 kg/mm$^2$, preferably 50 to 100 kg/mm$^2$, such as a film of biaxially stretched polyethylene terephthalate, polyethylene naphthalate, polyamide, polyimide, polyamideimide, aromatic polyamide or polybenzoxidazole. In particular, an aramide resin or polyethylene naphthalate film is preferred as the non-magnetic support because it can have sufficient stiffness even when the thickness thereof is small to a certain extent.

These non-magnetic support materials may undergo in advance corona discharge, plasma treatment, adhesion-increasing treatment, thermal treatment and dust removal treatment. The non-magnetic support used in the invention is generally adjusted so as to have a center-line average surface roughness of 0.5 to 7.0 nm on the side where the non-magnetic lower layer is coated. Besides being small in center-line average surface roughness, the present support is preferably free of coarse projections measuring 1 µm or above in height. The surface roughness dimensions can be adjusted freely by selecting sizes and amounts of fillers added to the support as needed. Examples of such fillers include inorganic fine powders of oxides or carbonates of Al, Ca, Si and Ti (crystalline or amorphous), and organic fine powders of acrylic and melamine resins. For ensuring running durability, it is appropriate that the surface roughness of the support be greater on the side to be coated with a backing layer than on the side to be coated with a magnetic layer. The suitable center-line average surface roughness of the support on the side to be coated with a backing layer is at least 1 nm, preferably at least 4 nm. In order to let the two sides of a support differ in surface roughness, the support having a dual constitution may be used or a coating layer may be formed on one side of the support. The suitable F-5 values of non-magnetic support used in the invention are from 10 to 50 kg/mm$^2$ in the tape-running direction and from 10 to 30 kg/mm$^2$ in the tape width direction. In general, the F-5 value is higher in the tape length direction than in the tape width direction. However, this needs not apply in special cases where the necessity of heightening the strength in the width direction arises. The suitable thermal shrinkage ratio of the non-magnetic support in both tape-running and width directions is at most 3%, preferably at most 1.5%, under heating at 100° C. for 30 minutes, and at most 1%, preferably at most 0.5%, under heating at 80° C. for 30 minutes. It is advantageous for the support to have its tensile strength at break in the range of 5 to 100 kg/mm$^2$ in both directions, and its elasticity modulus in the range of 100 to 2,000 kg/mm$^2$. Further, the suitable light transmittance of the tape-shaped non-magnetic support at the wavelength of 900 nm is 30% or below, preferably 3% or below.

The process of preparing a magnetic coating composition for the present magnetic recording medium comprises at least a kneading step, a dispersing step and mixing steps provided before or after these steps as needed. Each step may be constituted of at least two stages. Each of ingredients used for the coating composition, such as a ferromagnetic powder, a binder, carbon black, an abrasive, an antistatic agent, a lubricant and a solvent, may be added at the beginning or in the course of every step. In addition, each ingredient may be divided into two or more portions, and added in separate steps. For instance, the input of polyurethane resin may be divided among a kneading step, a dispersing step and a mixing step for viscosity adjustment after dispersion. It goes without saying that hitherto known techniques for production may be applied to some steps for producing the present magnetic recording medium. Further, a mighty kneading machine, such as a continuous kneader or a pressurized kneader, can be utilized at the kneading step for securing enhanced dispersibility. The details of kneading treatment are described in JP-A-1-166338 and JP-A-64-79274. On the other hand, in the case of preparing a coating composition for forming a non-magnetic layer, it is desirable to use a dispersion medium greater in specific gravity, and zirconia beads are suitable as such a dispersion medium.

For producing a magnetic recording medium having a multilayer structure in the invention, a wet-on-wet coating method is preferably adopted, and the following coating systems can be proposed:

(1) a non-magnetic lower layer is formed first by the use of a coating machine usually used for coating magnetic coating compositions, such as a gravure, roll, blade or extrusion coater. And while it is in a wet condition, the lower layer is coated with a magnetic layer by the use of a pressurized support type extrusion coating machine as disclosed in JP-B-1-46186, JP-A-60-238179 and JP-A-2-265672, (2) an upper layer and a lower layer are coated almost simultaneously by the use of a coating head having 2 slits for passage of coating compositions as disclosed in JP-A-63-88080, JP-A-2-17971 and JP-A-2-265672, and (3) an upper layer and a lower layer are coated almost simultaneously by the use of a backup roll-attached extrusion coating machine as disclosed in JP-A-2-174965.

In addition, it is desirable to apply a sheering stress to the coating composition in the interior of a coating head by the use of the method disclosed in JP-A-62-95174 or JP-A-1-236968 for the purpose of preventing electromagnetic characteristics of the magnetic recording medium to be formed from degrading due to agglomeration of magnetic particles. Further, it is required for the coating compositions to have their viscosity in the numerical range disclosed in JP-A-3-8471.

For producing a magnetic recording medium, it is generally required to perform treatment for creating a strongly oriented state in the recording medium. For effecting such a treatment, it is appropriate to apply a magnetic field generated from a combination of solenoid of at least 1,000 G (0.1 T) and a cobalt magnet of at least 2,000 G (0.2 T) placed so that the same poles thereof face each other. However, when the present magnetic recording medium has a squareness ratio of 0.85 or greater by undergoing strong orientation treatment, the error rate thereof becomes worse. Therefore, the squareness ratio control is required for the present magnetic recording medium, and effected by, e.g., setting the magnetic field of solenoid at 1,000 G (0.1 T) or below. For performing high-density recording, on the other hand, tilting the easy magnetization axis to the vertical direction is known to be generally effective, irrespective of crystal shape of ferromagnetic powder, e.g., acicular or tabular. Therefore, it is advantageous to combine the foregoing squareness ratio control with such tilting of easy magnetization axis. In addition, it is appropriate that some combination of known means to heighten adhesiveness, such as formation of an adhesive layer containing a polymer as a main component, corona discharge, UV irradiation and EB irradiation, be applied to the non-magnetic support prior to simultaneous coating of non-magnetic and magnetic layers.

Furthermore, a heat-resistant plastic roll, such as a roll made from epoxy resin, polyimide, polyamide or polyimideamide, is used in calendering treatment. A pair of metal rolls can also be used for the treatment. The suitable treatment temperature is from 80 to 120° C., preferably 90 to 100° C., and the suitable linear pressure applied is from 200 to 500 kg/cm, preferably from 300 to 400 kg/cm.

The suitable coefficients of friction of the magnetic layer surface and the opposite surface of the present magnetic recording medium against SUS 420J is from 0.1 to 0.5, preferably from 0.2 to 0.3, and the suitable surface resistibility is from $10^4$ to $10^{12}$ Ω/sq. The suitable elasticity modulus of the magnetic layer under 0.5% elongation is from 100 to 2,000 kg/mm$^2$ in each of running and width directions, and the appropriate strength at break is from 1 to 30 kg/cm$^2$. The suitable elasticity modulus of the magnetic recording medium in each of running and width directions is from 100 to 1,500 kg/mm$^2$, the appropriate residual elongation is at most 0.5%, and the appropriate thermal shrinkage ratio at all temperatures of no higher than 100° C. is at most 1%, preferably at most 0.5%, particularly preferably at most 0.1%, and ideally 0%. The suitable glass transition temperature of the magnetic layer (the maximum point of loss elasticity modulus in the kinetic viscoelasticity measurement made at 110 Hz) is from 50° C. to 120° C., and that of the non-magnetic lower layer is from 0° C. to 100° C. The appropriate loss elasticity modulus is from $1\times10^8$ to $8\times10^9$ dyne/cm$^2$, and the appropriate loss tangent is at most 0.2. When the loss tangent is too great, a tackiness trouble tends to occur. The appropriate content of residual solvent in the magnetic layer is 100 mg/m$^2$ or below, preferably 10 mg/m$^2$ or below, and it is advantageous that the residual solvent content in the magnetic layer is lower than that in the non-magnetic lower layer. The appropriate porosity of non-magnetic lower layer and that of magnetic layer are both 30 volume % or below, preferably 20 volume % or below. The smaller porosity is more favorable for achieving high output, but the porosity may be increased up to a value depending on the desired purpose. As to the repetition use-oriented magnetic media for data recording, for example, the greater porosity is more favorable for ensuring running durability in many cases.

The present magnetic recording medium has the non-magnetic lower layer and the magnetic layer as described above, and it is easily guessed that the non-magnetic lower layer and the magnetic layer may differ in the physical characteristics as recited above depending on the intended purpose. For instance, the running durability is enhanced by elevating a elasticity modulus of the magnetic layer, and at the same time the elasticity modulus of the non-magnetic lower layer is rendered lower than that of the magnetic layer to better a head touch on the magnetic recording medium. In addition, it is effective in the invention also to change a tensilizing method of the support and thereby to improve the head touch. Many of support materials tensilized in the direction perpendicular to the length direction of tape have better head touch.

Examples of the invention are presented below, and the invention is illustrated in more detail by reference thereto. However, the invention should not be construed as being limited to these examples. Unless otherwise noted, all "parts" and all "%" in the following description are by weight.

EXAMPLES 1 TO 11, AND COMPARATIVE EXAMPLES 1 TO 7

| [Ingredients in Coating Composition for Magnetic Layer] | |
|---|---|
| Fe-dominated ferromagnetic metal powder as shown in Table 1 | 100 parts |
| Vinyl chloride copolymer (MR-100, a product of ZEON CORP.) | 10 parts |
| Polyurethane resin | 6 parts |
| Urethane group concentration: 4.0 mmol/g | |
| Ether group concentration: 5.0 mmol/g | |
| Molecular weight (Mw): $4 \times 10^4$ | |
| Proportions (by mole) of structural units: | |
| Hydrogenated bisphenol A (Rikanobeal HB, produced by Shin-Nippon Rika) | 0.6 |
| Polypropylene oxide adduct of Bisphenol A (molecular weight: 600) | 0.3 |
| Ethylene oxide adduct of sulfo-isophthalic acid | 0.05 |
| Diphenylmethane isocyanate | 1.0 |
| Trimethylolpropane | 0.05 |
| —SO$_3$Na group content: $1 \times 10^{-4}$ eq/g | |
| Tg: 90° C. | |
| α-Alumina (average particle size: 0.15 μm) | 5 parts |
| Carbon black (particle size: 0.08 μm) parts | 1.5 |

| -continued | |
|---|---|
| [Ingredients in Coating Composition for Magnetic Layer] | |
| Butyl stearate | 1 parts |
| Stearic acid | 2 parts |
| Methyl ethyl ketone | 90 parts |
| Cyclohexanone | 30 parts |
| Toluene | 60 parts |

TABLE 1

| | Magnetic powder | | | | |
|---|---|---|---|---|---|
| | A | B | C | D | E |
| Hc (Oe*[1]) | 2510 | 2650 | 2840 | 2560 | 2320 |
| Co (atomic %) | 30 | 35 | 35 | 38 | 30 |
| Y (atomic %) | 10 | 11 | 15 | 3.4 | 7 |
| Nd (atomic %) | — | — | — | 1.5 | — |
| Al (atomic %) | 23.5 | 24.5 | 23 | 10.1 | 14 |
| Si (atomic %) | — | — | — | 3.2 | — |
| Long axis length (μm) | 0.1 | 0.13 | 0.13 | 0.1 | 0.1 |
| Specific surface area (m$^2$/g) | 50 | 42 | 50 | 58 | 45 |

*[1]expressed in Oe (which stands for oersted) terms

When Oe is converted into kA/m by dividing the Oe by 79, Hc of each magnetic powder is as follows:

A: 198.3 kA/m, B: 209.4 kA/m, C: 224.4 kA/m, D: 202.2 kA/m,

E: 183.3 kA/m.

| [Ingredients in Coating Composition for Non-magnetic lower layer] | |
|---|---|
| α-Fe$_2$O$_3$ (hematite) | 80 parts |
| Average particle length: 0.15 μm | |
| Specific surface area determined by BET: 52 m$^2$/g | |
| pH: 9 | |
| Tap density: 0.8 | |
| DBP absorptive capacity: 27–38 g/100 g | |
| Surface treatment agent: Al = 6 at %, Si = 7 at %, P = 1 at % | |
| Carbon black | 20 parts |
| Average primary particle size: 16 μm | |
| DBP absorptive capacity: 80 ml/100 g | |
| pH: 8.0 | |
| Specific surface area determined by BET: 250 m$^2$/g | |
| Volatile matter: 1.5% | |
| Vinyl chloride copolymer (MR-110, a product of ZEON CORP.) | 12 parts |
| Polyesterpolyurethane resin (the same urethane resin as used for the magnetic layer) | 5 parts |
| α-Al$_2$O$_3$ (average particle size: 0.2 μm) | 5 parts |
| Butyl stearate | 2 parts |
| Stearic acid | 2 parts |
| Methyl ethyl ketone | 100 parts |
| Cyclohexanone | 50 parts |
| Toluene | 50 parts |

The ingredients for each of the magnetic layer coating composition and the non-magnetic lower layer coating composition were kneaded by means of an open kneader, and then dispersed with a sand mill. To the dispersion prepared for each layer was added 5 parts of polyisocyanate (Colonate L produced by Nippon Polyurethane Industry Co., Ltd.). To each of the resulting dispersions was further added 40 parts of a mixture of methyl ethyl ketone and cyclohexanone. The thus prepared compositions were each passed through a filter having an average pore size of 1 μm, thereby preparing coating compositions for a non-magnetic lower layer and a magnetic layer respectively.

The thus prepared coating compositions were coated on a 6.5 μm-thick polyethylene terephthalate support having a center-line surface roughness of 0.0015 μm so that the coating composition for the magnetic layer had a thickness of 0.25 μm after drying and the coating composition for the non-magnetic layer had a thickness of 1.5 μm after drying. While both layers were in a wet condition, they were subjected to magnetic alignment treatment using a combination of a cobalt magnet having a magnetic force of 5,000G (0.5 T) and solenoid having a magnetic force of 6,000 G (0.6 T). The squareness ratio (SQ) of a magnetization curve was determined by varying the amount of current applied to the solenoid. After drying, the support was coated with a 0.5 μm-thick backing layer. Then, the support coated with those three layers was treated with a 7-stage calender constructed of a metal roll and an epoxy resin roll at a travelling speed of 200 m/min under a temperature of 100° C. The thus produced magnetic media were each slit into strips having a width of 6.35 mm, thereby making ¼ inch magnetic tapes.

The SQ ratios of the magnetic tapes produced in Example 1 and Comparative Examples 1 to 4 were each adjusted so as to fall within the range of 0.84 to 0.88, those of the magnetic tapes produced in Examples 2 to 7 and Comparative Example 5 were each adjusted so as to fall within the range of 0.80 to 0.84, and those of the magnetic tapes produced in Examples 8 to 11 were each adjusted so as to fall within the range of 0.74 to 0.77. Further, the magnetic tapes produced in Comparative Examples 6 and 7 were adjusted so as to have SQ ratios smaller than 0.70. The characteristics of the magnetic recording media obtained in Examples 1 to 11 and Comparative Examples 1 to 7 respectively were determined according to the following measurement methods. The results obtained are shown in Tables 2 to 6.

[Evaluation Methods]

(1) B-H Characteristic

A B-H characteristic of each magnetic tape was examined with a vibrating sample type of magnetometer (VSM, made by Toei Kogyo Co.) under a condition that the external magnetic field was set at 10 kOe (790 kA/m). The term SQ ratio is defined as a ratio of residual magnetic flux density Br to maximum (saturated) magnetic flux density Bm.

(2) 20.9 MHz Output 20.9 MHz signals were recorded on each magnetic tape with DVCPRO D750VTR (made by Matsushita Electric Industrial Co., Ltd.), and then played back. During the playback, the playback output of those recorded signals was measured with an oscilloscope. As a reference, a magnetic tape DP121 M66, made by Fuji Photo Film Co., Ltd., was used, and the playback output thereof was taken as 0 dB. When the magnetic tape examined had a playback output of 0 dB or above, it was judged as having satisfactory output.

(3) Bit Error Rate (BER) Measurement 20.9 MHz signals were recorded on each magnetic tape with DVCPRO D750VTR (made by Matsushita Electric Industrial Co., Ltd.), and then played back. During the playback, the playback output of 20.9 MHz signals was taken into a digital storage oscilloscope till the total number of bits amounted to 100,000. And BER was determined from the amount of distribution greater than the distribution width of bit amplitudes by-6 dB. Details of BER were proposed in JP-A-2000-40201. BER of $1\times10^{-5}$ or below was judged as being satisfactory.

(4) Still Measurement

Each sample tape was inserted into DVCPRO-VTR D750 under an environmental condition of −5° C., and RF output was observed in a still mode. Therein, the time at which the RF output disappeared was measured. When the duration of RF output was 60 minutes or longer, the tape was regarded as having a satisfactory still quality.

(5) Ra Measurement

The center-line roughness Ra was determined in accordance with MIRAU method utilizing a digital optical profimeter (made by WYKO) under a condition that the cut-off value was set at 0.25 mm, and expressed in nm.

TABLE 2

[Experiments on Squareness Ratio of 0.84 to 0.88]

| | Example 1 | Comparative Example 1 | Comparative Example 2 | Comparative Example 3 | Comparative Example 4 |
|---|---|---|---|---|---|
| | | | Magnetic powder | | |
| | A | B | C | D | E |
| Magnetic layer thickness | 0.26 μm | 0.23 μm | 0.24 μm | 0.26 μm | 0.25 μm |
| Tape Hc | 2610 Oe | 2840 Oe | 2960 Oe | 2690 Oe | 2470 Oe |
| Tape SQ | 0.84 | 0.87 | 0.88 | 0.86 | 0.86 |
| Tape SFD | 0.31 | 0.295 | 0.287 | 0.304 | 0.321 |
| Tape Ra | 2.8 nm | 2.4 nm | 2.3 nm | 2.4 nm | 2.3 nm |
| RF output | 1.4 | 2.1 | 2.3 | 1.7 | 1.5 |
| BER | $2 \times 10^{-5}$ | $8 \times 10^{-4}$ | $7 \times 10^{-4}$ | $9 \times 10^{-4}$ | $9 \times 10^{-4}$ |
| Still | 110 min | 50 min | 45 min | 50 min | 50 min | note:
When the squareness ratio was greater than 0.85, BER of the order of $10^{-5}$ was unattainable and the duration of still was also unattainable to the target figure of 60 min. On the other hand, when the squareness ratio was adjusted to 0.85 or below, it was successful to impart satisfactory BER and still quality to a magnetic tape.

TABLE 3

[Experiments on Squareness Ratio of 0.80 to 0.84]

| | Example 2 | Example 3 | Example 4 | Example 5 | Comparative Example 5 | Example 6 | Example 7 |
|---|---|---|---|---|---|---|---|
| | | | | Magnetic powder | | | |
| | A | B | C | D | E | B | B |
| Magnetic layer thickness | 0.26 μm | 0.26 μm | 0.24 μm | 0.25 μm | 0.27 μm | 0.12 μm | 0.05 μm |
| Tape Hc | 2580 Oe | 2810 Oe | 2940 Oe | 2650 Oe | 2450 Oe | 2820 Oe | 2830 Oe |
| Tape SQ | 0.80 | 0.82 | 0.84 | 0.81 | 0.81 | 0.81 | 0.80 |

TABLE 3-continued

[Experiments on Squareness Ratio of 0.80 to 0.84]

|  | Example 2 | Example 3 | Example 4 | Example 5 | Comparative Example 5 | Example 6 | Example 7 |
|---|---|---|---|---|---|---|---|
|  |  |  | Magnetic powder |  |  |  |  |
|  | A | B | C | D | E | B | B |
| Tape SFD | 0.36 | 0.34 | 0.32 | 0.35 | 0.35 | 0.35 | 0.36 |
| Tape Ra | 2.9 nm | 2.6 nm | 2.6 nm | 2.5 nm | 2.7 nm | 2.8 nm | 2.4 nm |
| RF output | 1.1 | 1.7 | 1.8 | 1.2 | 1.0 | 1.9 | 1.0 |
| BER | $5 \times 10^{-5}$ | $2 \times 10^{-5}$ | $1 \times 10^{-5}$ | $3 \times 10^{-5}$ | $8 \times 10^{-4}$ | $4 \times 10^{-5}$ | $5 \times 10^{-5}$ |
| Still | 160 min | 120 min | 120 min | 160 min | 180 min | 100 min | 70 min |

TABLE 4

[Experiments on Squareness Ratio of 0.74 to 0.77]

|  | Example 8 | Example 9 | Example 10 | Example 11 |
|---|---|---|---|---|
|  |  | Magnetic powder |  |  |
|  | A | B | C | D |
| Magnetic layer thickness | 0.24 μm | 0.25 μm | 0.26 μm | 0.24 μm |
| Tape Hc (Oe) | 2540 | 2770 | 2860 | 2620 |
| Tape SQ | 0.75 | 0.77 | 0.74 | 0.76 |
| Tape SFD | 0.40 | 0.37 | 0.40 | 0.40 |
| Tape Ra (nm) | 2.8 | 2.9 | 2.6 | 2.6 |
| RF output | 0.6 | 1.2 | 1.1 | 0.9 |
| BER | $3 \times 10^{-5}$ | $4 \times 10^{-5}$ | $5 \times 10^{-5}$ | $3 \times 10^{-5}$ |
| Still (min) | 210 | 220 | 240 | 240 |

TABLE 5

[Experiments on Squareness smaller than 0.70]

|  | Comparative Example 6 | Comparative Example 7 |
|---|---|---|
|  | Magnetic powder |  |
|  | C | D |
| Magnetic layer thickness | 0.25 μm | 0.25 μm |
| Tape Hc (Oe) | 2717 | 2543 |
| Tape SQ | 0.61 | 0.68 |
| Tape SFD | 0.46 | 0.45 |
| Tape Ra (nm) | 2.5 | 2.6 |
| RF output | −0.1 | −0.5 |
| BER | $7 \times 10^{-4}$ | $2 \times 10^{-4}$ |
| Still (min) | 210 | 240 |

TABLE 6

[Comparative Experiments on Urethane resins]

|  | Comparative Example 8 | Comparative Example 9 |
|---|---|---|
|  | Magnetic powder |  |
|  | A | A |
| Magnetic layer thickness | 0.25 μm | 0.26 μm |
| Tape Hc (Oe) | 2500 | 2460 |
| Tape SQ | 0.85 | 0.83 |
| Tape SFD | 0.41 | 0.45 |
| RF output | 1.1 | 1.8 |
| Tape Ra (nm) | 2.1 | 1.9 |
| BER | $2 \times 10^{-4}$ | $4 \times 10^{-4}$ |
| Still (min) | 44 | 23 |

[Comparison of Urethane Resins]

In Comparative Example 8 was used a urethane resin differing in constituent units from the urethane resin used in Example 1 and having Tg of 64° C. In Comparative Example 9, on the other hand, the urethane resin used in Example 1 was replaced by UR5500 having Tg of 39° C. produced by Toyobo Co. These cases were both reduced in still quality. A graph of a relation between Tg values of the urethane resins used in Example 1, Comparative Example 8 and Comparative Example 9 respectively and still quality is shown in FIG. 1. As can be seen from FIG. 1, Tg of not lower than 70° C. is required for attaining the still quality target of 60 min.

In accordance with the invention can be provided a magnetic recording medium delivering satisfactory error rate and durability when applied to an apparatus for record and playback at frequencies of 10 MHz or higher.

This application is based on Japanese patent application JP 2000-383798, filed Dec. 18, 2000, the entire content of which is hereby incorporated by reference, the same as if set forth at length.

What is claimed is:

1. A magnetic recording medium comprising: a non-magnetic support; a lower non-magnetic layer; and a magnetic layer containing a ferromagnetic powder and a binder, in this order, wherein the magnetic layer has a coercive force of 2,500 to 3,500 oersted (197.5 to 276.5 kA/m), and a squareness ratio of 0.70 to 0.85 in a length direction thereof, and the binder in the magnetic layer is a urethane resin having a glass transition temperature Tg of 70° C. or higher.

2. The magnetic recording medium according to claim 1, wherein the ferromagnetic powder is dispersed in the binder.

3. The magnetic recording medium according to claim 1, wherein the ferromagnetic powder comprises: Fe; 30 to 40 atomic % of Co based on Fe; 2 to 20 atomic % in total of at least one of Al and Si based on Fe; 7 to 15 atomic % in total of at least one of Y and Nd based on Fe, and has a specific surface area of no greater than 80 m²/g as measured by BET method.

4. The magnetic recording medium according to claim 1, wherein the magnetic layer has a thickness of 0.05 to 0.3 μm.

5. The magnetic recording medium according to claim 1, wherein the lower layer has a thickness of 0.8 to 2.0 μm.

6. The magnetic recording medium according to claim 1, has a maximum magnetic flux density Bm of no greater than 3,800 Gauss.

7. The magnetic recording medium according to claim 1, wherein the lower layer contains a polyurethane having a glass transition temperature Tg of 70° C. or higher.

8. The magnetic recording medium according to claim 1, wherein the magnetic recording medium has a total thickness of 4.5 to 8.5 μm.

9. The magnetic recording medium according to claim 1, wherein the support is a film of polyethylene terephthalate resin, polyethylene naphthalate resin, polyaramide resin or polyurethane resin.

10. The magnetic recording medium according to claim 1, wherein the lower layer comprises a non-magnetic powder, and the non-magnetic powder is at least one selected from the group consisting of titanium dioxide, (α-iron oxide, barium sulfate, zinc oxide and alumina.

11. The magnetic recording medium according to claim 1, wherein the magnetic layer comprises 100 parts by weight of ferromagnetic metal powder, 8 to 24 parts by weight of binder and 3 to 15 parts by weight of non-magnetic powder.

12. The magnetic recording medium according to claim 1, wherein the lower layer and at least one magnetic layer that is in contact with the lower layer are formed by wet-on-wet coating method.

* * * * *